(12) United States Patent
Tuneld et al.

(10) Patent No.: US 9,672,403 B2
(45) Date of Patent: Jun. 6, 2017

(54) METHOD AND FINGERPRINT SENSING SYSTEM FOR AUTHENTICATING A CANDIDATE FINGERPRINT

(71) Applicant: FINGERPRINT CARDS AB, Göteborg (SE)

(72) Inventors: Mats Tuneld, Lund (SE); Eric Setterberg, Västra Frölunda (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 14/847,536

(22) Filed: Sep. 8, 2015

(65) Prior Publication Data
US 2016/0078274 A1    Mar. 17, 2016

(30) Foreign Application Priority Data

Sep. 16, 2014 (SE) ...................... 1451084

(51) Int. Cl.
*G06K 9/00* (2006.01)
*G06K 9/03* (2006.01)

(52) U.S. Cl.
CPC ....... *G06K 9/0002* (2013.01); *G06K 9/00006* (2013.01); *G06K 9/00597* (2013.01); *G06K 9/00885* (2013.01); *G06K 9/036* (2013.01)

(58) Field of Classification Search
None
See application file for complete search history.

(56) References Cited

U.S. PATENT DOCUMENTS

| | | | |
|---|---|---|---|
| 6,259,804 B1 | 7/2001 | Setlak et al. | |
| 2006/0045315 A1* | 3/2006 | Saitoh | G06K 9/00026 382/115 |
| 2007/0003110 A1* | 1/2007 | Gutta | G06K 9/00006 382/115 |
| 2009/0196468 A1* | 8/2009 | Chang | G06F 3/0488 382/124 |
| 2010/0245553 A1* | 9/2010 | Schuler | G06K 9/00006 348/77 |

(Continued)

FOREIGN PATENT DOCUMENTS

| | | |
|---|---|---|
| EP | 2731038 A2 | 5/2014 |
| JP | 2000353236 A | 12/2000 |

(Continued)

OTHER PUBLICATIONS

PCT International Search Report dated Dec. 16, 2015 for PCT International Application No. PCT/SE2015/050959, 5 pages.

*Primary Examiner* — Utpal Shah
(74) *Attorney, Agent, or Firm* — Remarck Law Group PLC

(57) ABSTRACT

The present invention generally relates to a method for authenticating a candidate fingerprint using a fingerprint authentication system, and specifically to the possibility of using personalized fingerprint sensor setting for a fingerprint sensor comprised with the fingerprint authentication system. The invention also relates to a corresponding electronic device and to a computer program product. Advantages with the invention include a minimized processing time for acquiring a good quality fingerprint image, thus increasing user convenience.
The invention also relates to a corresponding fingerprint sensing system and to a computer program product.

17 Claims, 4 Drawing Sheets

(56) References Cited

U.S. PATENT DOCUMENTS

| | | | | |
|---|---|---|---|---|
| 2012/0016798 A1* | 1/2012 | Carper | ............... | G06Q 20/1085 |
| | | | | 705/43 |
| 2014/0133710 A1* | 5/2014 | Hama | ................ | G06K 9/00087 |
| | | | | 382/115 |
| 2015/0106403 A1* | 4/2015 | Haverinen | ........ | G06F 17/30604 |
| | | | | 707/792 |
| 2015/0220767 A1* | 8/2015 | Yoon | .................. | G06K 9/00006 |
| | | | | 382/124 |

FOREIGN PATENT DOCUMENTS

| | | | |
|---|---|---|---|
| JP | 2002083289 A | 3/2002 |
| JP | 2007189395 A | 7/2007 |
| KR | 100652148 B1 | 12/2006 |

* cited by examiner

METHOD AND FINGERPRINT SENSING SYSTEM FOR AUTHENTICATING A CANDIDATE FINGERPRINT

CROSS-REFERENCE TO RELATED APPLICATIONS

This application claims priority to Swedish Application No. 1451084-6, filed Sep. 16, 2014. The disclosure of the above application is incorporated herein by reference in its entirety.

TECHNICAL FIELD

The present invention generally relates to a method for authenticating a candidate fingerprint using a fingerprint authentication system, and specifically to the possibility of using personalized fingerprint sensors setting for a fingerprint sensor comprised with the fingerprint authentication system. The invention also relates to a corresponding fingerprint sensing system and to a computer program product.

BACKGROUND OF THE INVENTION

Various types of biometric systems are used more and more in order to provide for increased security for accessing an electronic device, thereby providing an enhanced user convenience. In particular fingerprint sensors have been successfully integrated in such devices, for example, thanks to their small form factor, high performance and user acceptance. Among the various available fingerprint sensing principles (such as capacitive, optical, thermal etc.), capacitive sensing is most commonly used, in particular in applications where size and power consumption are important issues.

All capacitive fingerprint sensors provide a measure indicative of the capacitance between several sensing elements and a finger placed on the surface of the fingerprint sensor. Acquisition of a fingerprint image is typically performed using a fingerprint sensor comprising a plurality of sensing elements arranged in a two-dimensional manner, and a block based technique may be applied to the fingerprint sensor for acquiring a fingerprint image, where the blocks of sensing elements are sampled sequentially. As an example, a block of eight sensing elements adjacently arranged in one row and connected to a plurality of A/D conversion means, for example including include at least one amplifier having a controllable gain, may be sampled at the same time.

Generally there is a large variation in the intensity in the acquired fingerprint image, for example due to different finger types, finger conditions, different users, different sensing conditions, or based on manufacturing process variations. Thus, it is typically necessary to adjust the dynamic range of the A/D conversion means and/or to control the gain of the amplifier. Accordingly, an iterative/repeated sampling process is performed using different the settings for the A/D conversion means and/or the amplifier, with the purpose of acquiring a "good quality" fingerprint image. The problem with such a process is that it will be time consuming and thus inconvenient for the user.

An exemplary implementation for trying to overcome this problem is disclosed in U.S. Pat. No. 6,259,804. U.S. Pat. No. 6,259,804 disclose the use of a gain processor that may comprise histogram generating means for generating a histogram of previously performed A/D conversions. Based on the generated histogram it may be possible to control the range of the A/D conversion means, to set the gain and for controlling the offset of the amplifier.

Even though U.S. Pat. No. 6,259,804 introduces an interesting approach to faster acquisition of a good quality fingerprint image, the disclosed approach will not make any distinction between previously successfully acquired fingerprint images, thereby making the approach highly ineffective in the general user environment. Thus, there appears to be room for further improvement in regards to the determination of control parameters for fast acquisition of a good quality fingerprint image.

SUMMARY OF THE INVENTION

In view of above-mentioned and other drawbacks of the prior art, it is an object of the present invention to provide an improved method for authenticating a candidate fingerprint using a fingerprint authentication system. In particular, the present inventors have found that it may be desirable to introduce personalized sensor setting to be used when acquiring a fingerprint image.

According to an aspect of the present invention, it is therefore provided a method of authenticating a candidate fingerprint against an enrolled fingerprint of a finger by means of a fingerprint authentication system comprising a fingerprint sensor, a memory and processing circuitry connected to said fingerprint sensor, wherein the method comprises receiving, by said processing circuitry, an authentication request for said finger, retrieving, by said processing circuitry from said memory based on said authentication request for said finger, a fingerprint sensor setting associated with a stored enrolment representation of the enrolled fingerprint of said finger, the memory storing a plurality of different sets of sensor settings, controlling, by said processing circuitry, said fingerprint sensor using the retrieved fingerprint sensor setting, acquiring, by said fingerprint sensor, a fingerprint image of said candidate fingerprint to be authenticated, forming, by said processing circuitry, an authentication representation of said candidate fingerprint based on said fingerprint image, comparing, by said processing circuitry, said authentication representation with said stored enrolment representation in view of an authentication criterion, and providing, by said processing circuitry, an authentication signal indicative of a result of the comparison The present invention is based upon the necessity to dynamically adjust the operational settings for a fingerprint sensor to be able to create the best possible fingerprint image for e.g. wet, dry, or difficult-to-read fingers. This is according to prior-art typically achieved by automatically adjusting the sensitivity of the fingerprint sensor, for example by adjusting a level of amplification of a gain control module comprised with the fingerprint sensor. Thereby, it will be possible to minimize for example broken or merged ridges to be identified within the fingerprint image caused by dry or wet fingers or by generally varying ambient conditions.

However, as discussed above in relation to a prior art implementation the automatic adjustment of e.g. the gain control module is an iterative and thus time consuming process. The present inventors have identified the possibility of "personalizing" fingerprint sensor settings by combining e.g. a set (or sets, i.e. a plurality of) of sensor settings with a stored representation of an enrollment representation of an enrolled fingerprint of a finger.

Thus, when a selected and previously enrolled finger is to be authenticated, predefined sensor settings for that specific finger may be acquired and used for controlling the fingerprint sensor such that in the most advantageous case there will be no necessity to iteratively adjust the settings for the fingerprint sensor as e.g. an initial operating point (for a specific finger) may be set for the fingerprint sensor. Accordingly, advantages with the invention include a minimized processing time for acquiring a good quality fingerprint image, thus increasing user convenience.

In the context of the invention, the finger is in some manner connected to a user ID. Such a connection may be a default connection (e.g. in case of a mobile phone used by a single user), or in any way specified before initiating the inventive method. Such a specification may for example take place by entering a specific user ID, by clicking a user name (e.g. an icon on a display screen), user entry in a specific software application, etc. Other methods of course exist and are within the scope of the invention.

In the context of the invention, the sensor settings for a (specific/default) finger may typically be determined when enrolling the finger with the fingerprint authentication system. That is, when enrolling the finger for creating a representation (e.g. a feature template) of a fingerprint of the finger, the above for example discussed iterative process of adjusting the fingerprint sensor settings may take place, and the sensors setting used once an acquired fingerprint image representing the finger has a desired quality level are stored for later use. The sensor setting may for example be stored as metadata for the feature template created once a good quality fingerprint image has been acquired. Other forms for storing the sensor settings (e.g. in a relation database) are of course possible and may depend on the implementation in mind.

In a possible embodiment of the invention, the acquiring of the fingerprint image of said candidate fingerprint comprises a) acquiring an initial fingerprint image using said retrieved fingerprint sensor settings, b) determining, by said processing circuitry, a value of an image property of a most recently acquired fingerprint image, c) comparing the determined value of said image property with a stored range of values of said image property, if the determined value is outside said stored range d) determining an updated fingerprint sensor setting based on a difference between the determined value and said stored range, and e) acquiring a new fingerprint image using said updated fingerprint sensor setting, and if the determined value is inside said stored range f) assigning the most recently acquired fingerprint image as the fingerprint image of said candidate fingerprint to be authenticated.

Typically, if the acquired fingerprint image has e.g. a quality level at or above a predetermined threshold (i.e. a good quality fingerprint image has been acquired) the acquired fingerprint image is used for creating a feature template (of the finger) to be compared to the feature template created during enrollment of the finger. However, in case e.g. the quality level is below the predetermined threshold (i.e. a "bad quality" fingerprint image has been acquired), the sensor settings may be updated in a manner such that in the end a good quality fingerprint image is acquired. Other metrics may of course be used for determining if the sensor settings should be adjusted, and such metrics are preferably incorporated in the process of adapting the sensor setting, i.e. allowing the new sensor settings to be at least partly dependent of the determined metric. In an embodiment, the process of adjusting the sensor settings may be performed until e.g. the quality level at or above a predetermined threshold.

In case of having to adjusting the sensor settings for acquiring a fingerprint image, and the authentication signal indicates authentication success, it is preferred to store such updated sensor settings. The updated sensor settings are in a similar manner as during enrollment of the finger stored in some type of association/connection with the finger, e.g. in a database. Accordingly, a plurality of different sets of sensor setting may be associated with the same finger.

In an embodiment of the invention it may be possible to adjust the authentication criterion based on the determined value of said image property of said initial fingerprint image. By applying such a process, it may be possible to take into account e.g. the quality of the acquired fingerprint image when authenticating the fingerprint. That is, in case the acquired fingerprint image is of an in comparison bad quality, it may for example be desirable to "harden" the criterion for authenticating the fingerprint.

In the above description, the image property of an acquired fingerprint image has been related to the quality of the fingerprint image. The "quality" as such may be determined by for example the saturation and/or histogram width of the acquired fingerprint image. Further metrics exists, including for example a measure for the "ease" of acquiring a feature template from the acquired fingerprint image.

As mentioned above, the sensor settings may for example include information as to controlling a gain setting of the fingerprint sensor. It may also be possible to control a range for A/D conversion means used in acquiring the fingerprint image. This will be further discussed below in relation to the detailed description of the invention.

In some embodiment of the invention it may be desirable to retrieve a signal indicative of an environmental condition that may affect a property of said finger, and control said fingerprint sensor additionally based on said signal. As also mentioned above, the fingerprint sensor may in some instances behave in somewhat different ways dependent on ambient conditions. Such conditions may for example include temperature and/or humidity in the vicinity of the fingerprint sensor (e.g. acquired using one of a temperature sensor and a humidity sensor). In a possible embodiment, different sensor settings may be pre-stored for different ambient conditions and used dependent on such conditions. It may also be possible to adapt the sensor settings based on a known relation between a specific environmental condition and a likely sensor setting to be used for such a condition. As an example, it may be possible to correlate the ambient temperature with the setting used for the gain control of the fingerprint sensor. For example, a high ambient temperature may typically result in a lower gain level as compared with operation of the fingerprint sensor in a low temperature environment.

According to another aspect of the present invention, there is provided a fingerprint sensing system, comprising a fingerprint sensor, a memory, and processing circuitry connected to said fingerprint sensor for receiving an authentication request for said finger, retrieving, from said memory based on said authentication request for said finger, a stored fingerprint sensor setting associated with a stored enrolment representation of the enrolled fingerprint of said finger, the memory storing a plurality of different sets of sensor settings, controlling an operating point of said fingerprint sensor using/based on the retrieved fingerprint sensor setting, controlling said fingerprint sensor to acquire a fingerprint image of said candidate fingerprint to be authenticated, forming an authentication representation of said candidate fingerprint based on said fingerprint image, comparing said authentication representation with said stored enrolment representation in view of an authentication criterion, and providing an authentication signal indicative of a result of the comparison. This aspect of the invention provides similar advantages as discussed above in relation to the previous aspect of the invention.

The fingerprint sensor may, as indicated above, be implemented using any kind of currently or future fingerprint sensing principles, including for example capacitive, optical, or thermal sensing technology. However, at present capacitive sensing is most preferred. Both one and two-dimensional sensors are possible and within the scope of the invention.

The fingerprint sensing system preferably forms part of an electronic device further comprising a device controller for providing said authentication request for said finger to the fingerprint sensing system, receiving said authentication signal from the fingerprint sensing system, and performing at least one action only if said authentication signal indicates authentication success. Such an action may for example be for unlocking a locked portable device, e.g. in case the portable device is a mobile phone. The at least one action may of course be any type of action suitably used when there is a need to authenticate a finger.

According to a further aspect of the present invention, there is provided a computer program product comprising a computer readable medium having stored thereon computer program means for controlling a portable electronic device, the portable electronic device comprising a fingerprint authentication system including a fingerprint sensor, a memory and processing circuitry, the fingerprint authentication system adapted for authenticating a candidate fingerprint against an enrolled fingerprint of a finger, wherein the computer program product comprises code for receiving an authentication request for said finger, code for retrieving a fingerprint sensor setting from said memory based on said authentication request for said finger, the fingerprint sensor setting associated with a stored enrolment representation of the enrolled fingerprint of said finger, the memory storing a plurality of different sets of sensor settings, code for controlling said fingerprint sensor using the retrieved fingerprint sensor setting, code for acquiring a fingerprint image of said candidate fingerprint to be authenticated, code for forming an authentication representation of said candidate fingerprint based on said fingerprint image, code for comparing said authentication representation with said stored enrolment representation in view of an authentication criterion, and code for providing an authentication signal indicative of a result of the comparison.

The processing circuitry preferably includes an ASIC, a micro processor or any other type of computing device. Similarly, a software executed by the processing circuitry for operating the inventive functionality may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

In summary, present invention generally relates to a method for authenticating a candidate fingerprint using a fingerprint authentication system, and specifically to the possibility of using personalized fingerprint sensor setting for a fingerprint sensor comprised with the fingerprint authentication system. The invention also relates to a corresponding electronic device and to a computer program product. Advantages with the invention include a minimized processing time for acquiring a good quality fingerprint image, thus increasing user convenience.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
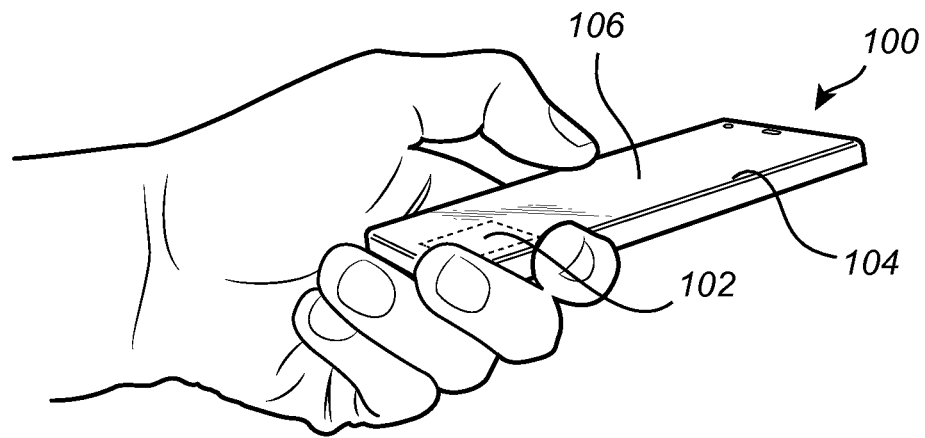
FIG. 1 schematically exemplify an electronic device according to the present invention, in the form of a mobile phone comprising an integrated fingerprint sensor.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Turning now to the drawings and to FIG. 1 in particular, there is schematically illustrated the electronic device according to the present invention, in the form of a mobile phone 100 with an integrated fingerprint sensor 102 and a display unit 104 with a touch screen interface 106. In this embodiment the fingerprint sensor 102 and the display unit 104 are together arranged at the front side of the mobile phone 100. The fingerprint sensor 102 may, for example, be used for unlocking the mobile phone 100 and/or for authorizing transactions carried out using the mobile phone 100, etc. The fingerprint sensor 102 may of course also be placed on the backside of the mobile phone 100.

Preferably and as is apparent for the skilled person, the mobile phone 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that the invention may be applicable in relation to any other type of portable electronic device, such as a laptop, a remote control, a tablet computer, or any other type of present or future similarly configured device.

Figure 2:
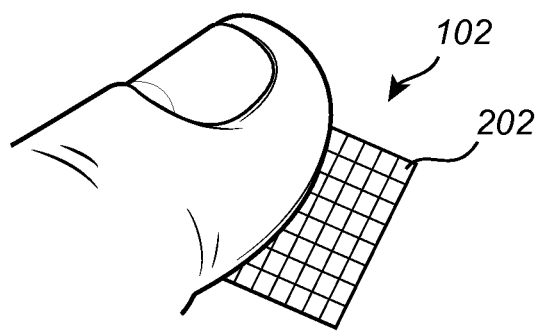
FIG. 2 schematically shows the fingerprint sensor array comprised in the electronic device in FIG. 1.

With reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. In an embodiment, 160×160 pixels are used. Other sizes are of course possible and within the scope of the invention. A single sensing element (also denoted as a pixel) is in FIG. 2 indicated by reference numeral 202.

Figure 3:
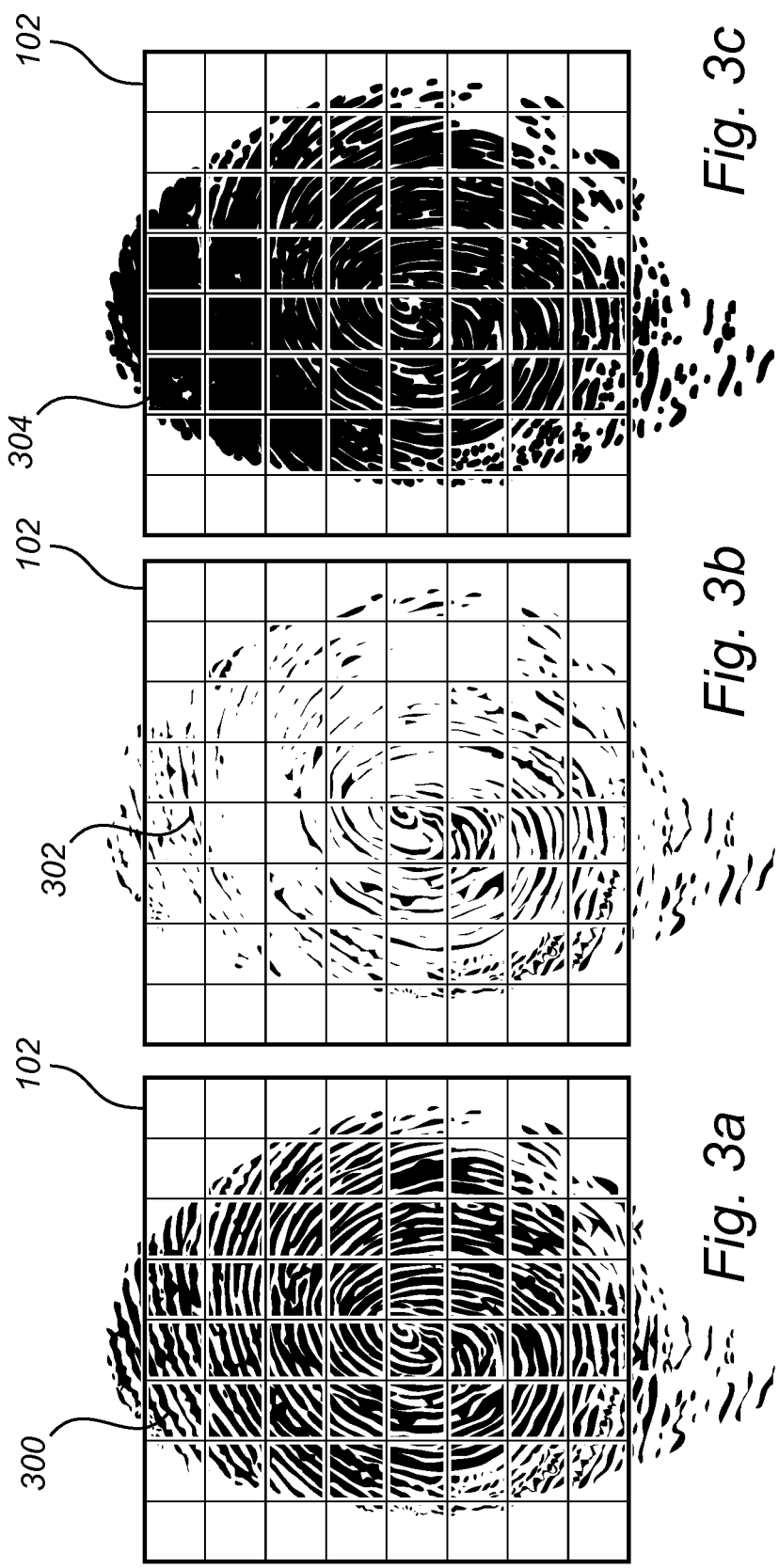
FIG. 3a-3c illustrates a sequence of three fingerprint images of a fingerprint as detected by a fingerprint sensor.

Turning now to FIGS. 3a-3c which shows a sequence of three fingerprint images of a fingerprint as detected by a conventional fingerprint sensor. As briefly discussed above, the output of a conventional fingerprint sensors can also be affected by finger conditions and/or due to variations in the manufacturing process. In regards to different finger conditions, the valley-to-ridge ratio may for example vary from person to person. This results in variation from person to person in a ratio of dark-to-light pixels, and thus the contrast, in the captured fingerprint image. Moisture content of skin of the finger can also affect sensor performance. In dry air, such as that found in winter or an air-conditioned environment, a finger tends to have less moisture. In hot, moist air, the finger sweats, resulting in a darker image, relative to that of a dry finger. Conversely, a dry finger produces a lighter image than that of a wet finger. As an example, FIG. 3a illustrates a "normal" finger 300, FIG. 3b illustrates a dry finger 302 and FIG. 3c illustrates a wet finger 304, respectively, captured using a fingerprint sensor.

As mentioned above, overcoming the problem with different finger conditions generally includes using an automatic gain control technique for adjusting the gain level an amplifier used, in conjunction with the fingerprint sensor, when capturing the fingerprint image. Typically, at least one of the average or peak signal level of a captured fingerprint image are analyzed and used for adjusting the gain to a suitable level. Generally, an in comparison high amplification is desirable for dry fingers, an in comparison low amplification for wet fingers and an in comparison medium amplification is desirable for normal fingers. By tuning the amplification based on e.g. different finger conditions, it will be possible to keep a sufficient contrast between ridges and valleys of the fingerprint, thus allowing a good use of the sensors full dynamic range, enabling a high quality feature extraction (i.e. being a representation of the fingerprint).

Figure 4:
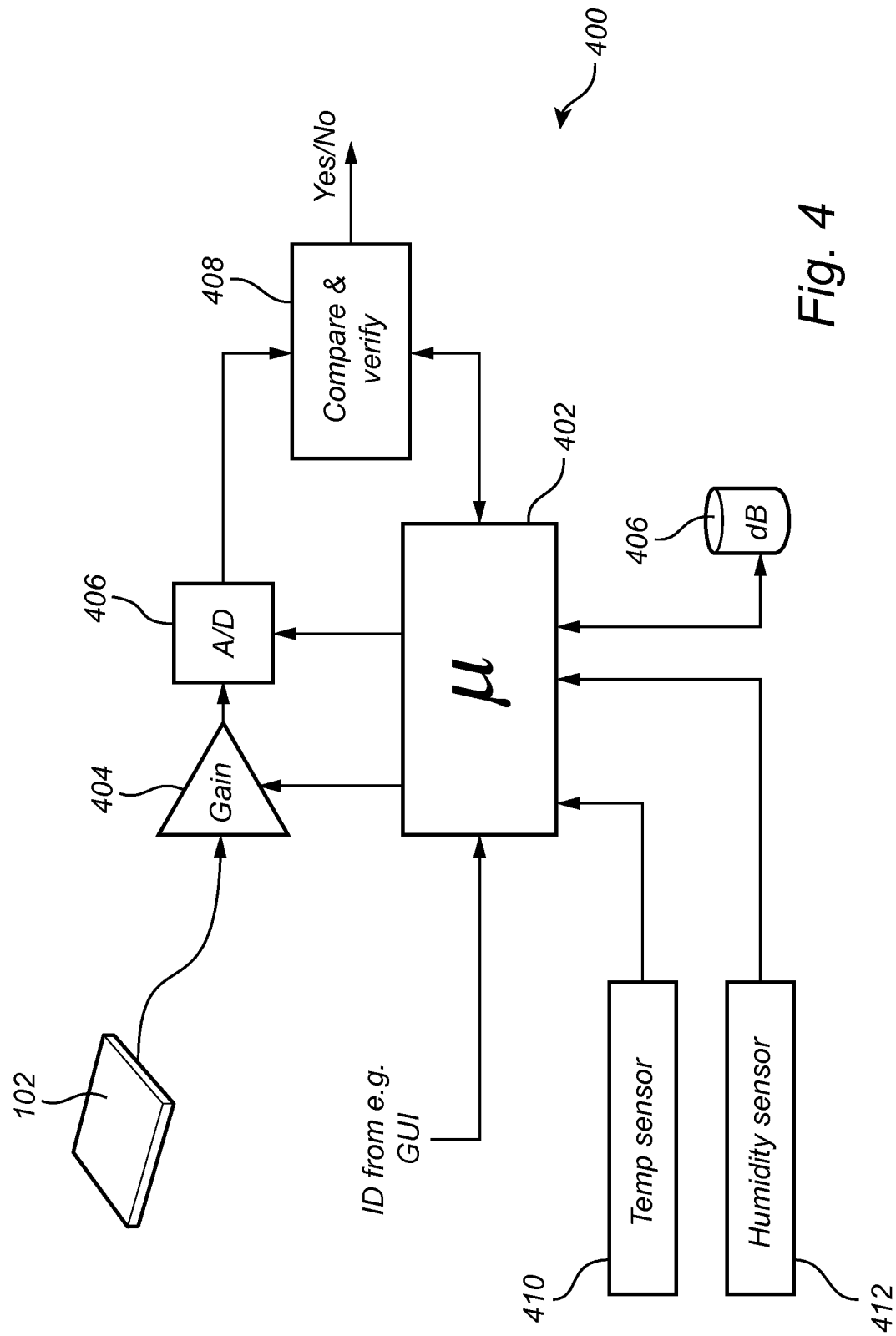
FIG. 4 conceptually illustrates a fingerprint sensing system according to a currently preferred embodiment of the invention

However the prior-art approach is time consuming due to its iterative nature where different gain levels must be tested before a proper fingerprint image has been acquired. This is specifically apparent in a case where more than a single amplifying element is used, e.g. where a plurality of amplifying elements are arranged in a cascade. In accordance with the invention, the fingerprint sensor 102 is controlled in for example a personalized manner for acquiring a proper fingerprint image. Such a control methodology may for example be implemented using the conceptualized fingerprint sensor system 400 as is illustrated in FIG. 4. The fingerprint sensor system 400 in turn, typically, forms part of the electronic device/mobile as is exemplified in FIG. 1.

The fingerprint sensor system 400 comprises the fingerprint sensor 102 and a processing circuitry, such as a control unit 402 for controlling the fingerprint sensor 102. The fingerprint sensor system 400 further comprises a gain module 404, an A/D conversion module 406 and a memory, such as a database 406. The gain module 404, the A/D conversion module 406 and the database 406 are all in communicative connection with the control unit 402. In addition, the fingerprint sensor system 400 comprises a comparison and verification module 408, adapted for authenticating a candidate fingerprint against an enrolled fingerprint. As discussed above, a plurality of amplifying elements may be used/combined. In such a case, the pre-stored sensor setting as discussed in relation to the invention may comprise settings for each of the plurality of amplifying elements.

Figure 5:
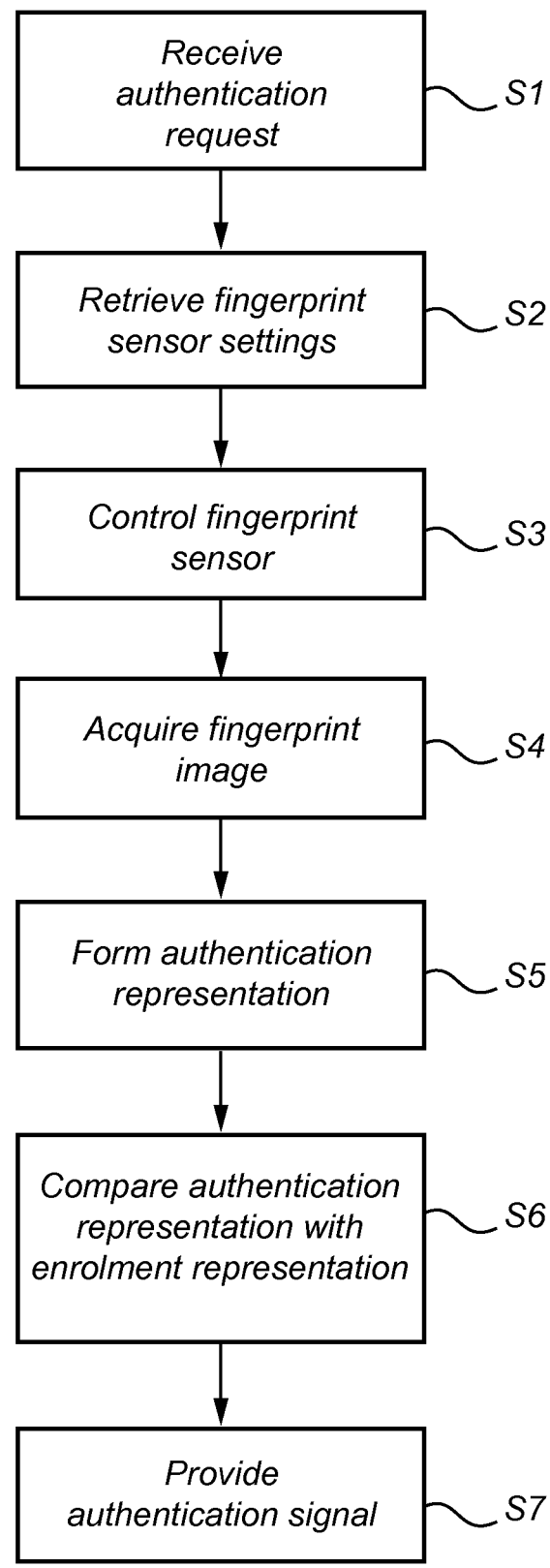
FIG. 5 is a flowchart disclosing the exemplary steps of the invention typically performed in conjunction with the fingerprint sensing system of FIG. 4.

During operation of the fingerprint sensor system 400, with further reference to FIG. 5, an authentication request is received, S1, by the control unit 402. The authentication request typically includes a reference to the finger to be authenticated, such as by a user name or other type or identity association (below the term ID will be used). The ID in turn may be acquired in many different ways and dependent on the specific implementation. In one exemplary embodiment, the ID for the finger to be authenticated is acquired by a user entering a predetermined user name or by clicking (or tapping) on an icon within a graphical user interface (GUI) representative of a specific user. The user ID may be in some instances be pre-allocated to a specific device comprising the fingerprint sensor system 400. One example of such a scenario is when the fingerprint sensor system 400 is comprised with a mobile phone. In such a case, the mobile phone is typically personal, i.e. only used by a single person/user. Thus, the mobile phone may be configured to (always) use the ID for the (single) user of the mobile phone. This type of implementation may of course be possible in relation to other type of devices, e.g. a laptop, table, etc., or when the fingerprint sensor system 400 is used with a single user desktop computer.

Alternatively, in some instances it may be desirable to use the authentication of the finger as a security measure in a software application, such as for example in relation to a login procedure for a mail account, in a banking app/client, etc. In such a case, the ID may already have been disclosed (e.g. as a user name for the mail account/banking app/client), and thus the control unit 102 may be provided with a representation of the ID.

Once the ID has been determined, the control unit 402 retrieves, S2, a fingerprint sensor setting having a relation to the finger with the associated ID that is to be authenticated. The fingerprint sensor setting may for example be stored within the database 406. The database 406 is typically arranged in a secure and encrypted location within e.g. the electronic device/mobile phone 100.

The fingerprint sensor 102 is in turn controlled, S3, using the fingerprint sensor settings. According to the invention, the fingerprint sensor settings may include at least one of a control level for the gain module 404 and or the A/D conversion module 406. The gain module may be controlled in regards to both (or one of) amplification and offset. The A/D conversion module 406 may for example be controlled such that a maximum amount of the resolution is used for performing an A/D conversion of an analog signal from the fingerprint sensor 102.

Accordingly, once the fingerprint sensor 102 is controlled as desired in regards to fingerprint sensor settings, the control unit 102 controls the fingerprint sensor 102, to e.g. block-wise (sequentially) sample the pixels of the fingerprint sensor 102, and thereby acquires, S4, the digitized fingerprint image of the finger touching the active sensor area of the fingerprint sensor 102.

In some instances it may be necessary to go through the process of acquiring a fingerprint image more than once. That is, in some instances the quality of the fingerprint image acquired using the fingerprint sensor settings may not be as good as desired. In such a case, a possible adjustment of the fingerprint sensor settings may be necessary to accommodate the acquisition of a good fingerprint image. For making a determination as to the quality of the initially acquired fingerprint image, it may be possible to determine a value of an image property for the initially acquired fingerprint image. This image property value may then be compared to a previously stored value (or range), and used for tuning the fingerprint sensor settings when acquiring the next fingerprint image. The concept of using the image property in relation to fingerprint image acquisition will be further discussed below.

An authentication representation, e.g. a feature extraction/fingerprint template typically based on minutiae extraction, is formed, S5 for the fingerprint of finger to be authenticated. Based on the ID previously received, the control unit 102 acquires a previously enrolled representation (e.g. stored as representative features/fingerprint template for the fingerprint) of the fingerprint from the database 406 and compares, S6, using the comparison and verification module 408 the previously enrolled representation (or fingerprint template) with the acquired authentication representation. The comparison and verification module 408 in turns outputs (provides), S7, an authentication signal indicative of a result of the comparison.

In case of a positive comparison, the authentication signal may be used for unlocking the mobile phone 100, for authenticating the user with the mail account, and/or banking app/client. In case of a negative comparison, the user may once again be requested to go through the process of fingerprint authentication.

As mentioned above, it may be possible to determine an image property for the fingerprint image when acquiring the fingerprint image. The image property may for example relate to the level of saturation and or a histogram width for the acquired fingerprint. As understood by the skilled addressee when reviewing FIGS. 3a-3c, the level of saturation as well as the histogram width will be different for each of the fingerprint images. For example, the saturation level for the dry finger (FIG. 3b) will be in comparison low whereas the saturation level for the wet finger (FIG. 3c) will be in comparison high.

In accordance to the invention, it is not necessary to acquire a complete fingerprint image for determining the image property for the fingerprint image. That is, it would be possible to only sample the sensing elements 202 of a selected portion of the fingerprint sensor 102 and use this portion when determining the image property. In such a case a corresponding image property value should preferably be stored in e.g. the database 406.

It may in accordance with the invention be possible to store (e.g. in the database 406) the level of the image property together with the sensor settings during enrollment of the finger. Thus, during operation of the fingerprint sensor system 400, the level of the image property determined during subsequently acquired fingerprint images may be compared to the previously stored image property level.

In case the image property level for the subsequently acquired fingerprint images is somewhat different from the previously stored image property level (e.g. not within a predetermined range of the stored image property level), it may be possible to adjust the sensor settings until the acquired fingerprint images generates image property levels being within the prescribed range. The new fingerprint sensor settings may be stored in the database 406 together with or instead of the previously stored fingerprint sensor settings. It may be advantageous to store a plurality of sets of fingerprint sensor settings in the database 406, thereby creating "clusters" of fingerprint sensor settings. It may also be possible to store a plurality of sets of image property levels (values) for subsequently successfully authenticated fingerprint images. The clusters may in turn be used in the authentication process, as further features to be related to (and used in the comparison of) fingerprint templates.

Furthermore, it may in accordance to the invention be possible to adjust the authentication process based on the image property level for an acquired fingerprint image. As an example, in case the image property level is, in comparison, far away from the previously stored image property level, it may be desirable to "harden" the authentication process as a large difference between image property levels of stored and acquired fingerprints may be an indication of fake fingerprint (fingerprint spoofing), for example using a "dummy" finger.

Along the same line, in case a successful featured comparison (fingerprint template comparison) is performed, but the fingerprint sensor settings needed for making such a successful comparison are far away from what was previously stored (e.g. during enrollment of the finger), this may be seen as an indication of a fake or dummy finger (e.g. not being a "live" finger). Thus, also the typical finger condition and/or the typically used fingerprint sensor setting for a specific user may be taken into account for authenticating the finger.

Still further, it may in accordance to the invention optionally be possible to configure the control unit 402 to acquire/receive an indication of at least one of a current ambient temperature and a humidity level surrounding the fingerprint sensor and/or the finger. That is, at least one of a temperature sensor 410 and a humidity sensor 412 may be connected to the control unit 402. The measurements provided at least one of the temperature sensor 410 and the humidity sensor 412 may for example be used for adapting the fingerprint sensor settings based on current conditions surrounding the fingerprint sensor 102.

The control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

What is claimed is:

1. A method of authenticating a candidate fingerprint against an enrolled fingerprint of a specific finger of a specific user by means of a fingerprint authentication system comprising a fingerprint sensor, a memory and processing circuitry connected to said fingerprint sensor, wherein the method comprises:
   receiving, by said processing circuitry, an authentication request for said specific finger, the authentication request including a reference to said specific finger to be authenticated;
   retrieving, by said processing circuitry from said memory based on said authentication request for said specific finger, a fingerprint sensor setting associated with a stored enrollment representation of the enrolled fingerprint of said specific finger, the memory storing a plurality of different sets of sensor settings for different enrolled fingers of different users;
   controlling, by said processing circuitry, said fingerprint sensor using the retrieved fingerprint sensor setting;
   acquiring, by said fingerprint sensor, a fingerprint image of said candidate fingerprint to be authenticated;
   forming, by said processing circuitry, an authentication representation of said candidate fingerprint based on said fingerprint image;
   comparing, by said processing circuitry, said authentication representation with said stored enrolment representation in view of an authentication criterion; and
   providing, by said processing circuitry, an authentication signal indicative of a result of the comparison.

2. The method according to claim 1, wherein acquiring of the fingerprint image of said candidate fingerprint comprises:
   a) acquiring an initial fingerprint image using said retrieved fingerprint sensor settings;
   b) determining, by said processing circuitry, a value of an image property of a most recently acquired fingerprint image;
   c) comparing the determined value of said image property with a stored range of values of said image property;
   if the determined value is outside said stored range:
   d) determining an updated fingerprint sensor setting based on a difference between the determined value and said stored range; and
   e) acquiring a new fingerprint image using said updated fingerprint sensor setting; and
   if the determined value is inside said stored range:
   f) assigning the most recently acquired fingerprint image as the fingerprint image of said candidate fingerprint to be authenticated.

3. The method according to claim 2, comprising performing b) to e) until the determined value is inside said stored range.

4. The method according to claim 2, further comprising:
   storing, if said authentication signal indicates authentication success, said updated fingerprint sensor setting.

5. The method according to claim 2, further comprising:
   adjusting said authentication criterion based on the determined value of said image property of said initial fingerprint image.

6. The method according to claim 2, wherein said image property is image saturation.

7. The method according to claim 1, wherein said fingerprint setting comprises a gain setting.

8. The method according to claim 1, further comprising:
   retrieving a signal indicative of an environmental condition that may affect a property of said specific finger; and
   controlling said fingerprint sensor additionally based on said signal.

9. The method according to claim 2, wherein said image property is a histogram width.

10. The method according to claim 2, wherein said image property is a quality for the acquired fingerprint, and the method further comprises:
    adjusting said authentication criterion based on the determined value of said image property of said initial fingerprint image, wherein the authentication criterion is inversely related to the quality of the acquired fingerprint.

11. A fingerprint sensing system, comprising:
    a fingerprint sensor;
    a memory; and
    processing circuitry connected to said fingerprint sensor for:
    receiving an authentication request for a specific finger of a specific user, the authentication request including a reference to said specific finger to be authenticated;
    retrieving, from said memory based on said authentication request for said specific finger, a stored fingerprint sensor setting associated with a stored enrolment representation of the enrolled fingerprint of said specific finger, the memory storing a plurality of different sets of sensor settings for different enrolled fingers of different users;
    controlling an operating point of said fingerprint sensor based on the retrieved fingerprint sensor setting;
    controlling said fingerprint sensor to acquire a fingerprint image of said candidate fingerprint to be authenticated;
    forming an authentication representation of said candidate fingerprint based on said fingerprint image;
    comparing said authentication representation with said stored enrolment representation in view of an authentication criterion; and
    providing an authentication signal indicative of a result of the comparison.

12. The fingerprint sensing system according to claim 11, wherein said fingerprint sensor is a capacitive fingerprint sensor.

13. An electronic device comprising:
    the fingerprint sensing system according to claim 11; and
    a device controller for:
    providing said authentication request for said finger to the fingerprint sensing system;
    receiving said authentication signal from the fingerprint sensing system; and performing at least one action only if said authentication signal indicates authentication success.

14. The electronic device according to claim 13, further comprising at least one sensor for sensing a local environment of said electronic device, said controller being configured to provide a signal indicative of an environmental condition that may affect a property of said finger to the fingerprint sensing system.

15. The electronic device according to claim 14, wherein said at least one sensor includes at least one sensor selected from a group comprising a temperature sensor and a humidity sensor.

16. The electronic device according to claim 13, wherein the electronic device is a mobile phone.

17. A computer program product comprising a non-transitory computer readable medium having stored thereon computer program means for controlling a portable electronic device, the portable electronic device comprising a fingerprint authentication system including a fingerprint sensor, a memory and processing circuitry, the fingerprint authentication system adapted for authenticating a candidate fingerprint against an enrolled fingerprint of a specific finger of a specific user, wherein the computer program product comprises:

code for receiving an authentication request for said specific finger, the authentication request including a reference to said specific finger to be authenticated;

code for retrieving a fingerprint sensor setting from said memory based on said authentication request for said specific finger, the fingerprint sensor setting associated with a stored enrollment representation of the enrolled fingerprint of said specific finger, the memory storing a plurality of different sets of sensor settings for different enrolled fingers of different users;

code for controlling said fingerprint sensor using the retrieved fingerprint sensor setting;

code for acquiring a fingerprint image of said candidate fingerprint to be authenticated;

code for forming an authentication representation of said candidate fingerprint based on said fingerprint image;

code for comparing said authentication representation with said stored enrolment representation in view of an authentication criterion; and code for providing an authentication signal indicative of a result of the comparison.

* * * * *